(12) United States Patent
Hill et al.

(10) Patent No.: US 9,307,754 B1
(45) Date of Patent: Apr. 12, 2016

(54) FISH GRIPPING TOOL

(71) Applicants: Wiley Hill, San Antonio, TX (US);
Mark Hill, San Antonio, TX (US);
James Leland Hill, Lake Hills, TX (US)

(72) Inventors: Wiley Hill, San Antonio, TX (US);
Mark Hill, San Antonio, TX (US);
James Leland Hill, Lake Hills, TX (US)

( * ) Notice: Subject to any disclaimer, the term of this patent is extended or adjusted under 35 U.S.C. 154(b) by 0 days.

(21) Appl. No.: 14/639,403

(22) Filed: Mar. 5, 2015

(51) Int. Cl.
*A01K 97/14* (2006.01)
*A01K 97/18* (2006.01)
*B25J 1/04* (2006.01)

(52) U.S. Cl.
CPC ............... *A01K 97/14* (2013.01); *A01K 97/18* (2013.01); *B25J 1/04* (2013.01)

(58) Field of Classification Search
CPC ..... A01K 97/14; A01K 97/18; A22C 25/006; A22C 25/06; A47G 21/10; A47J 43/283; B25J 1/04
USPC .............. 294/16, 19.3, 99.2, 902; 43/53.5
See application file for complete search history.

(56) References Cited

U.S. PATENT DOCUMENTS

| | | | | |
|---|---|---|---|---|
| 2,263,965 A * | 11/1941 | Fiori | .............................. | 294/99.2 |
| 2,585,089 A * | 2/1952 | Caldwell et al. | ................. | 24/559 |
| 2,757,951 A * | 8/1956 | Benton | ......................... | 294/99.2 |
| 2,800,356 A * | 7/1957 | Benton | .......................... | 294/106 |
| 2,881,022 A * | 4/1959 | Brust | ................................ | 294/25 |
| 3,259,415 A * | 7/1966 | Howard | ....................... | 294/99.2 |
| 3,321,736 A * | 5/1967 | Flynn | ............................. | 439/822 |
| 3,367,703 A * | 2/1968 | Pittis | ................................ | 294/16 |
| 3,664,703 A * | 5/1972 | Talley | ............................ | 294/118 |
| 3,727,269 A * | 4/1973 | Snead | ............................ | 452/196 |
| 3,905,145 A | 9/1975 | Cunningham | | |
| 3,921,327 A | 11/1975 | Casazza | | |
| 4,663,806 A * | 5/1987 | Mangum | ....................... | 452/195 |
| 4,682,803 A * | 7/1987 | Andrews | ....................... | 452/196 |
| 5,664,994 A | 9/1997 | Lai | | |
| 7,637,547 B2 * | 12/2009 | Schneider | ....................... | 294/16 |
| 7,661,222 B1 | 2/2010 | Bowers | | |
| 7,685,763 B1 | 3/2010 | Myers | | |

* cited by examiner

*Primary Examiner* — Dean Kramer
(74) *Attorney, Agent, or Firm* — Daniel Baudwin; Global Intellectual Property Agency, LLC.

(57) ABSTRACT

A seafood handling tool is provided that comprises a tong-like configuration with a first arm member and a second arm member in pivotal relationship to one another. The arm members are connected to one another along their proximal ends via a clevis, which extends from the first arm member and supports the second arm member from a pin joint. The clevis offsets the first and second arm member, while the pin joint allows the arm members to pivot relative to one another to accept larger or smaller seafood between the arm members along the distal ends. The distal ends of the arm members include elongated tines that extend from the inner surfaces thereof and towards one another. The tines engage an article of seafood while the user grips the proximal ends of the arm members, thereby separating the seafood from the handler.

6 Claims, 3 Drawing Sheets

FISH GRIPPING TOOL

BACKGROUND OF THE INVENTION

1. Field of the Invention

The present invention relates to fish and seafood handling tools. More specifically, the present invention relates to a pair of fish handling tongs that immobilize the fish and protect the user's hands from any defense mechanisms employed by the fish while the fish is being prepared or while removing a fishing hook therefrom.

The present invention relates to handling fish and other seafood items while preparing the same or while handling the animal after being caught. Different species of seafood employ various means of protection and self-defense against predators. When a fish, crab, or similar seafood animal is caught, handling the same exposes the user to these defense mechanisms, which can range from physical claws to toxic or poisonous appendages.

When handling fish after being reeled in by a fishing line, the fisherman must handle the first to grasp the fishing hook to remove the same, whereafter the fish can be stored, cleaned, or optionally released back into the water. Many fish include sharpened external fins or barbs, include sharpened teeth that can easy cut through skin, or employ various other defensive measures that can affect a handling fisherman. While many fishermen employ thick gloves to combat this risk, the fish may still squirm while out of water, making handling difficult and removing the hook a challenge.

The present invention addresses these concerns by providing an immobilizing tool that clamps onto the seafood item and employs sharpened teeth or tines along the arm members thereof to engage the seafood item, prevent movement thereof, and to distance the user's hands from the animal. The tool comprises a tong-like device with first and second arm members in pivotal relationship to one another. The interior surfaces of the arm members include elongated tines, while the proximal ends of the arm members secure to a pivoting clevis. The clevis extends from the first arm and supports the second arm from a pin joint offset from the first arm, thereby creating an offset between the proximal ends of the arms to accommodate seafood of various size and shape between the arms.

2. Description of the Prior Art

Devices have been disclosed in the prior art that relate to fish handling tools. These include devices that have been patented and published in patent application publications. The following is a list of devices deemed most relevant to the present disclosure, which are herein described for the purposes of highlighting and differentiating the unique aspects of the present invention, and further highlighting the drawbacks existing in the prior art.

One such device in the art is U.S. Pat. No. 7,661,222 to Bowers, which discloses a fish holding apparatus that includes a pair of biased plates supported by a holding mechanism that supports the plates in an upright condition. The mechanism may support the apparatus over a bucket, while the plates sandwich a fish therebetween to be cleaned or otherwise operated upon. The present invention relates to a pair of tong tools that are not biased together or affixable to a bucket, but rather provide a handheld tool for fisherman and seafood handlers.

U.S. Pat. No. 5,664,994 to Lai discloses a handheld fish-holding tong tool, whereby the tool comprises a pair of tongs pinned together to form a scissor like configuration. The tongs comprise a pair of fish gripping head pieces and a pair of handles. Each head piece includes rounded projections and an inner plate for gripping a fish and controlling the same. The head pieces are housings with open interiors that support the inner plates therein. The configuration of the tongs of Lai diverges from that of the present invention, both along the clamping end and along the proximal end of the tool.

Similar to Lai is U.S. Pat. No. 3,921,327 to Casazza, which discloses a fish holder with handles and opposing jaws. The jaws each have generally a C-shaped configuration composed of a web portions and a pair of upstanding flange portions. The jaws are in pivotal relationship with respect to one another and the C-shaped jaws are fastened to each of the handles. The Casazza device similarly fails to anticipate or render obvious the configuration of the present tong tool.

Finally, U.S. Pat. No. 3,905,145 to Cunningham discloses a fish holder that permits a freshly caught fish to be controlled while still attached to the fishing line and fishing hook. The device comprises a funnel-like device with a longitudinal slot therealong. The device includes a narrow upper opening and a wider lower opening, whereby the fish's head is held within the narrow upper opening and secured therein by a clamp. The clamp includes a knife-like inner portion that engages the fish. The Cunningham device provides a funnel tool that is particularly useful for removing fish hooks from the mouth of the fish. The present invention provides a tong tool that can handle fish and other forms of seafood, including crabs, lobsters, and the like.

Overall, the present invention provides a handheld tool with a tong-like configuration. A first arm is connected to a second arm at a clevis joint and offset from one another. The tong support elongated tines that oppose one another along the interior surfaces of the arms. The tool is used to support seafood when removing hooks therefrom, while handling the seafood generally, or while cleaning and filleting the same. It is submitted that the present invention is substantially divergent in design elements from the prior art, and consequently it is clear that there is a need in the art for an improvement to existing seafood handling tools. In this regard the instant invention substantially fulfills these needs.

SUMMARY OF THE INVENTION

In view of the foregoing disadvantages inherent in the known types of seafood handling tools now present in the prior art, the present invention provides a new, tong-like hand tool that can be utilized for providing convenience for the user when handling seafood without physically touching the same.

It is therefore an object of the present invention to provide a new and improved seafood handling tool that has all of the advantages of the prior art and none of the disadvantages.

It is another object of the present invention to provide a seafood handling tool that provides a gripping end and a seafood handling end that separates the handler from the seafood being handled to prevent exposure to the animal's defensive measures.

Another object of the present invention is to provide a seafood handling tool that includes a tong-like configuration with offset arm members and a seafood handling end that clamps the seafood from opposite sides thereof.

Yet another object of the present invention is to provide a seafood handling tool that includes arm members with elongated tines extending therefrom, which engages the animal and immobilize the same during handling.

Another object of the present invention is to provide a seafood handling tool that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
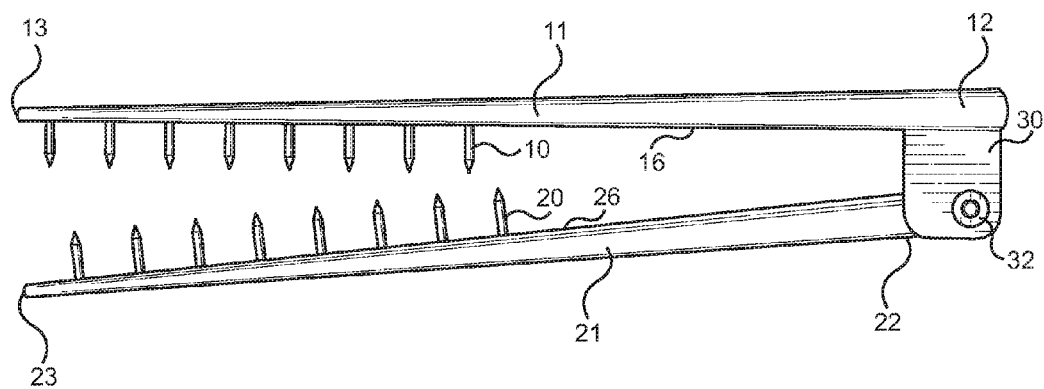
FIG. 1 shows a side view of the seafood handling tool of the present invention.

Reference is made herein to the attached drawings. Like reference numerals are used throughout the drawings to depict like or similar elements of the seafood handling tool of the present invention. For the purposes of presenting a brief and clear description of the present invention, the preferred embodiment will be discussed as used for handling seafood while fishing, cleaning, or otherwise handling the same. The figures are intended for representative purposes only and should not be considered to be limiting in any respect.

Referring now to FIG. 1, there is shown a side view of the seafood handling tool of the present invention. The tool comprises a first arm member 11 and a second arm member 21 connected to one another and in a pivotal relationship. The first arm member 11 includes a distal end 13, a proximal end 12, an elongated length and an inner surface 16 extending therealong. Similarly, the second arm member 21 includes a distal end 23, a proximal end 22, an elongated length, and an inner surface 26 extending therealong. The first and second arm members are mirrored pairs and form a gripping tool with a tong-like construction.

The distal ends 13, 23 of the arm members form the handling end of the tool, while the proximal ends 12, 22 form the gripping end of the tool. The tool is configured to allow a user to grip the gripping end, rotate the arms to surround a seafood item, and grasp the same using the handling end by compression of the arms against opposing sides of the seafood item. The length of the arms allows the user to grip the tool at a distance from the seafood item, separating the user's hand from any defensive mechanisms employed by the seafood item.

Figure 2:
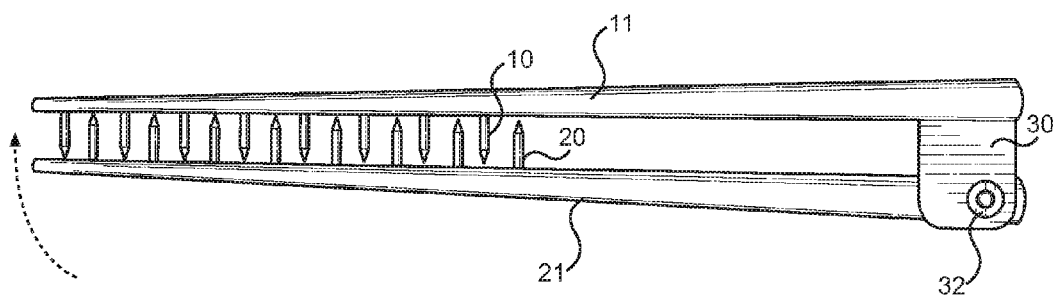
FIG. 2 shows a side view of the seafood handling tool in a closed state.

Referring to both FIGS. 1 and 2, the tines 10, 20 of the tool are visualized. The first arm member 11 supports a first set of tines 10 along its inner surface 16. Similarly, the second arm member 21 supports a second set of tines 20 along its inner surface 26. The two sets of tines oppose one another and are in a staggered configuration such that each set of tines can make contact with the inner surface of the opposing arm when the arm members are pivoted together and the tool is in its closed state. This state is represented in FIG. 2.

Figure 3:
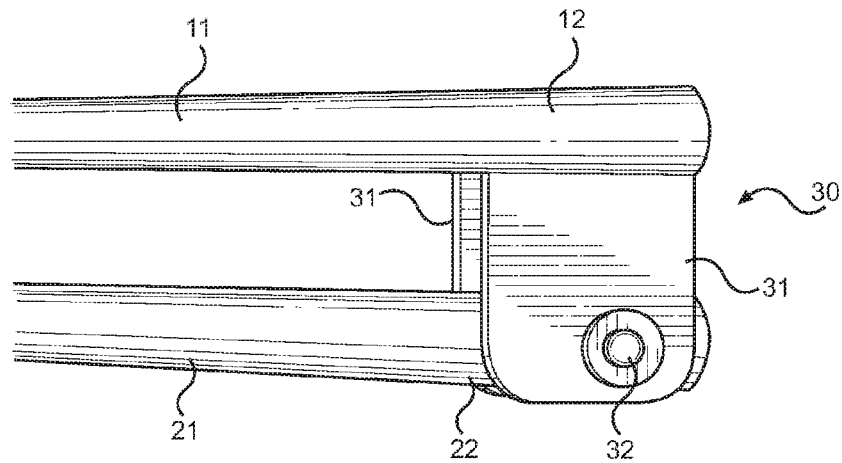
FIG. 3 shows a close-up view of the clevis of the handling end, which separates the arm members of the tool.

The first and second arm members are connected to one another along their proximal ends. The first arm member 11 includes a clevis 30 extending from its proximal end 12. The clevis 30, as shown in FIGS. 1-3, comprises a first and second clevis arm 31 separated from one another and in parallel to each other. The clevis arms 31 include an open interior within which the proximal end 22 of the second arm member 21 is positioned. The proximal end 22 thereof is connected to the clevis 30 using a pin joint 32, which allows rotation of the second arm member 21 relative to the first arm member 11.

The clevis 30 is vital to the construction of the tool in that it is used to offset the pivot point (pin joint 32) of the second arm member 21 from the first arm member 11, thereby creating an offset between the arms at the handling end of the tool. This allows the arms to pivot from one another, while providing clearance for the elongated tines and for gripping larger seafood items. The arms, when in a closed state, are parallel to one another and the tines are interlocked and bearing against the inner surface of the opposing arm.

Figure 4:
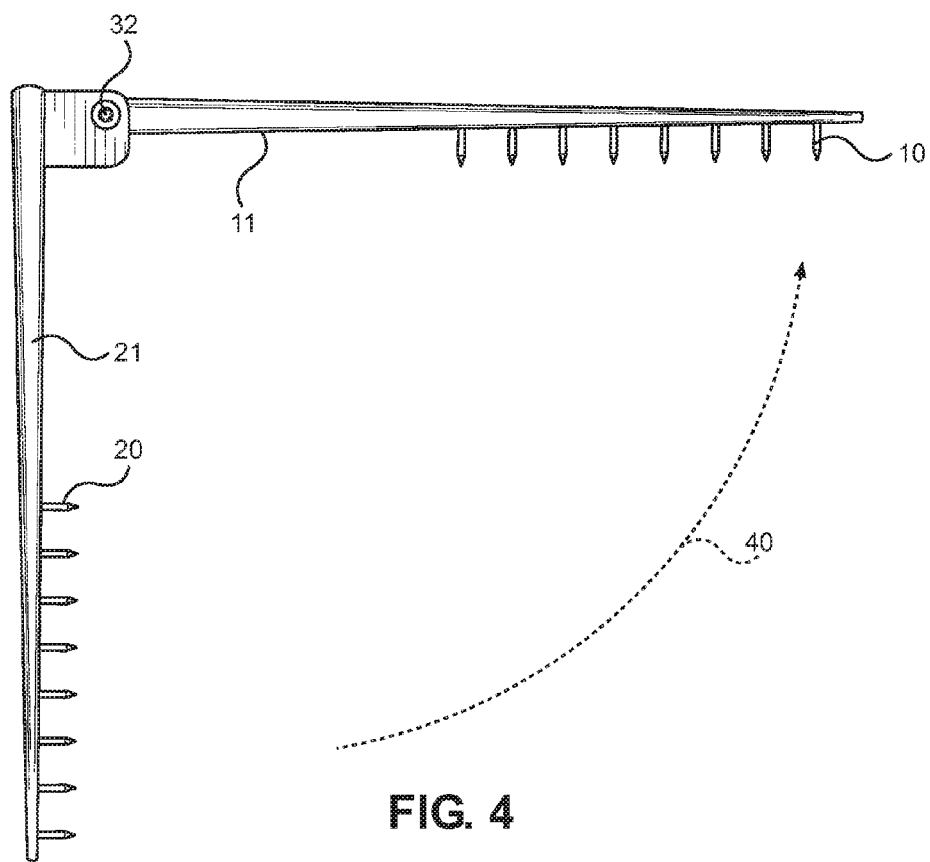
FIG. 4 shows the seafood handling tool opening to engage a larger seafood item, whereby the arm members can separate substantially from one another.

Referring now to FIG. 4, there is shown a view of the tool in an open state, whereby the arms are being separated from one another using the pin joint 32 to pivot the first arm member 11 from the second arm member 21. The arm members are elongated arms having either a rounded or flattened configuration. The arms can rotate relative to one another about the offset pin joint 32 to a degree that the arms can swing at least 180 degrees apart. This enlarged sweep 40 allows the arms to be separated when handling larger seafood items.

The tines 10, 20 of each arm comprise elongated members with a substantially cylindrical body and a sharpened tip. The tines engage the seafood article being held between the arm members, whereby the handler decides how much compression to apply to the seafood item by applying pressure on the arms. The tines can be used to immobilize the seafood by entering thereinto, or simply be used to grasp the outer shell or outer surface of the seafood article using minimal pressure. The tines are opposing and extend away from the inner surface of each arm member, and are staggered such that they overlap one another and do not interfere or clash when the arms are compressed together in a parallel, closed configuration.

Figure 5:
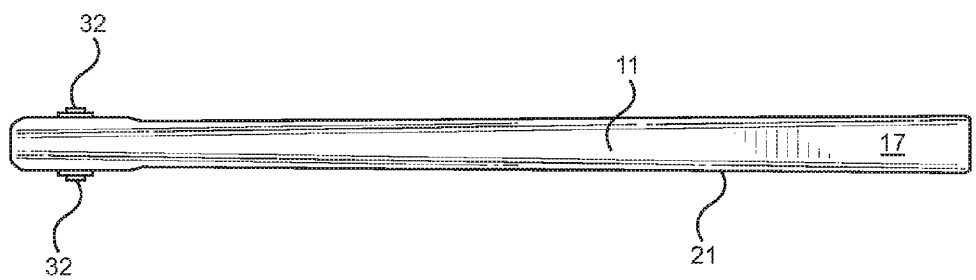
FIG. 5 shows an overhead view of the seafood handling tool of the present invention.

Referring finally to FIG. 5, there is shown an overhead view of the tool of the present invention. The arm members 11, 21 are elongated members having a cylindrical or flattened shape. A flattened shape arm member includes a flat outer surface 17 and a flat inner surface, while the outer edges are curved or perpendicular surfaces. The cylindrical arm members form curving outer surfaces around the periphery of the arm. The arm members are connected via the pin joint 32 which comprises a pin extending through the clevis and the proximal end of the second arm member.

Overall, the present invention provides a seafood handling tool with a tong-like configuration. The device immobilizes the seafood and distances the seafood from the handler. The device comprises a pair of arms with an offset pin joint, which enables the tool to pivot from its ends. The present invention is useful when handling seafood generally, as well as when securing a fish while removing a hook from its mouth. The device protects users from barbs of a fish and prevents a fish from squirming out of a handler's hands.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A seafood handling tool, comprising:
a first arm member and a second arm member;
each arm member comprising a proximal end, a distal end, an elongated length, and an inner surface;
said proximal end of said first arm member further comprising a clevis with a first and second clevis member;
said proximal end of said second arm member being disposed between said first and second clevis member and pivotably affixed thereto via a pin joint extending through said first and second clevis members and said proximal end of said second arm member;
wherein said distal end of said first arm member is adapted to rotate 180 degrees away from said distal end of said second arm member;
said inner surface of said first arm member having a first set of tines extending therefrom;
said inner surface of said second arm member having a second set of tines extending therefrom;
said first set of tines and said second set of tines being staggered along the length of each arm member such that when said first arm member and said second arm member are in a closed state of said tines intertwine one another.

2. The seafood handling tool of claim 1, wherein:
when said first arm member and said second arm member are in a closed state, said first arm member and said second arm member are parallel to one another and said tines bear against opposing inner surfaces of said first arm member and said second arm member.

3. The seafood handling tool of claim 1, wherein:
said pin joint is offset from the length of said first arm member by said clevis.

4. The seafood handling tool of claim 1, wherein:
said first arm member and said second arm member are substantially flat members with a flat inner surface and a flat outer surface.

5. The seafood handling tool of claim 1, wherein:
said first arm member and said second arm member are substantially cylindrical members with a curved inner surface and a curved outer surface.

6. The seafood handling tool of claim 1, wherein:
said tines are elongated, cylindrical members having a sharpened outer tip.

* * * * *